E. MARTIN.
SNATCH BLOCK.
APPLICATION FILED MAR. 22, 1909.
942,274.
Patented Dec. 7, 1909.
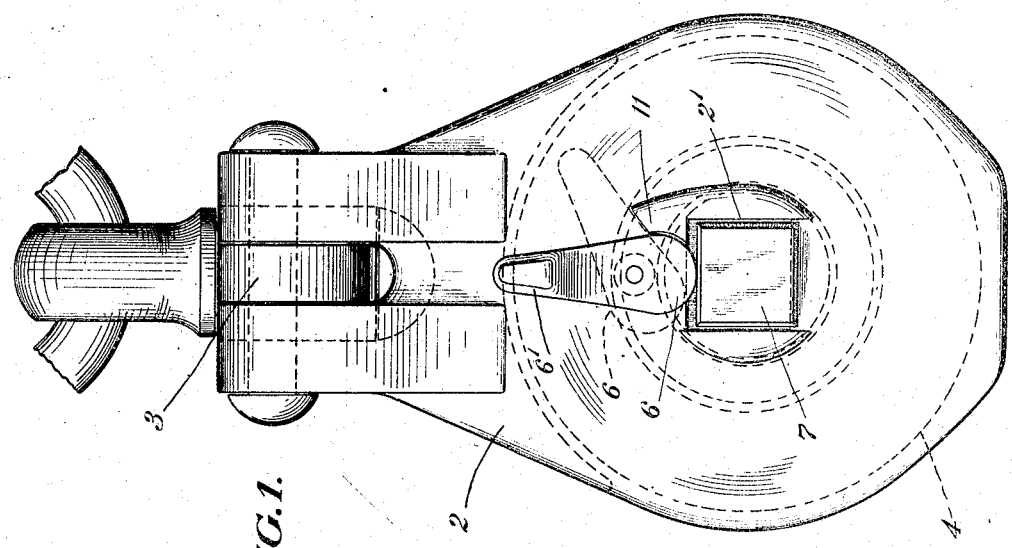
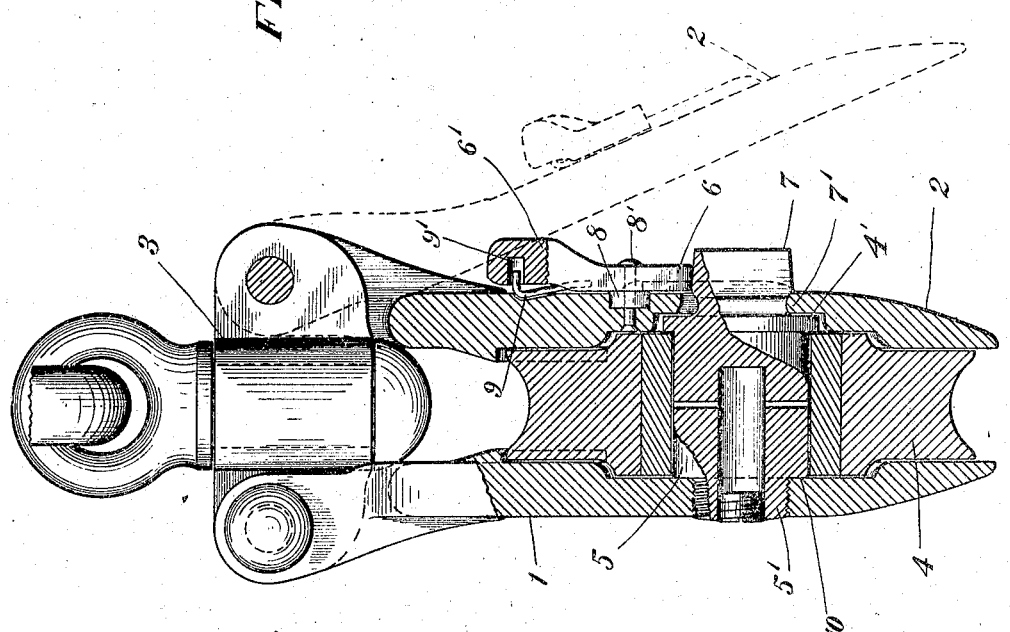
Inventor
Ernest Martin
Witnesses
Alex Currie
E. W. Cressman
By Adams & Brooks
Attorneys

UNITED STATES PATENT OFFICE.

ERNEST MARTIN, OF INDEX, WASHINGTON.

SNATCH-BLOCK.

942,274.　　　　　　　Specification of Letters Patent.　　Patented Dec. 7, 1909.

Application filed March 22, 1909.　Serial No. 485,102.

*To all whom it may concern:*

Be it known that I, ERNEST MARTIN, a citizen of the United States of America, and a resident of the town of Index, in the county of Snohomish and State of Washington, have invented certain new and useful Improvements in Snatch-Blocks, of which the following is a specification.

The primary object of my invention is to provide a snatch block of simple and durable construction which may be readily opened under various conditions.

A further object is a simplified and improved fastening means for securing the plates of the blocks.

Further objects and advantages will be set forth as the description progresses and those features on which I desire protection succinctly defined in the appended claims.

With reference to the accompanying drawing wherein like reference numerals designate corresponding parts throughout: Figure 1 is a side view of a block embodying the features of my invention, and Fig. 2 is a transverse section thereof.

I have illustrated my invention in a preferred form embodying opposite cheeks or plates as 1 and 2 having hinged connection with a cross head 3 and embracing a sheave 4 mounted on a pin or bearing 5 carried by plate 1. Thus either plate may be swung away from the other, and plate 2 shifted edgewise independently of plate 1 as will be later understood.

In conjunction with plate 2 I have provided a fastening including a cam, as 6, and a catch, as 7, the latter of which conveniently consists of a squared end extension of pin 5 fitting freely in an aperture 2′ of plate 2 and undercut at the base for engagement with the wall portion 7′ of said aperture. At the opposite side of this aperture I have shown the cam 6 rotatably mounted on plate 2 for engagement with the adjacent surface of catch 7 to move the plate to engage it with the catch. While the cam may be otherwise mounted I have shown the same provided with a circular base 8 rotatably seated in plate 2 concentric with a headed pin 8′ passing through said plate and the cam.

Connected with cam 6 is a handle 6′ which is arranged relatively thereto to extend toward the head of the block when the cam is applied and therefore be in line with the general movement of the block when employed in yarding or like operations.

Mounted on handle 6′ is a spring 9 arranged to bear upon plate 2 and thereby yieldingly hold the cam from movement. This spring as shown has its free end portion bent outwardly and engaged in a recess 9′ of the handle to support the spring against lateral strains imposed in operating the cam.

11 designates a stop consisting of a lug or projection provided on plate 2 at one side of cam 6 to limit the movement of the latter as clearly shown in Fig. 1.

As the wear of the journal pin is the greatest on the side toward the head of the block I preferably form pin 5 with an end portion 5′ of reduced diameter which has screw threaded connection with plate 1 so that the pin may be readily removed when worn and replaced with a washer under shoulder 10. The thickness of this washer should be such that the pin will be firmly seated at one quarter, one half or three quarters of a turn less than when the shoulder 10 engages the plate, so that the catch 7 will be properly presented for engagement in aperture 2′.

To open the block, handle 6′ is first forced toward stop 11 to the position indicated by broken lines in Fig. 1 and plate 2 then shifted edgewise to disengage it from catch 7. Either plate may now be swung on the cross head, as for example plate 2 may be swung to the position indicated by broken lines in Fig. 2 or plate 1 swung in the opposite direction as may be desirable when plate 2 is resting against a tree or log.

Having thus described my invention what I claim as new and desire to secure by Letters Patent of the United States of America, is:

1. In a snatch block construction, in combination, a bearing having one end portion formed angular in cross section, a cheek plate formed with an opening for reception of the angular end portion of said bearing, and a shifter for moving said cheek plate toward said bearing to effect a securing of one to the other.

2. In a snatch block construction, in combination, a bearing having one end portion formed angular in cross section, a cheek plate supported for edgewise movement and formed with an angular opening for reception of the angular end portion of said bearing, said angular end portion of said bearing and said cheek plate having parts for interlocking engagement with one another, and a shifter for shifting said cheek plate, as specified.

3. In a snatch block construction, in combination, a bearing having one end portion formed angular in cross section, a cheek plate supported for edgewise movement and formed with an angular opening for reception of the angular end portion of said bearing, said angular end portion of said bearing and said cheek plate having parts for interlocking engagement with one another, and an eccentric on said cheek plate arranged to engage said bearing, said eccentric being supported for rotation, for the purpose specified.

Signed at Index, Washington this 12th day of March 1909.

ERNEST MARTIN.

Witnesses:
 JAMES TAUBERNECK,
 OLE OLSEN.